Dec. 18, 1934.  H. S. STEEN  1,984,950

WASTE APPARATUS

Filed Jan. 4, 1934

Inventor:
Harry S. Steen,
By Byrnforth, Lee, Chritton & Wiles,
Attys.

Patented Dec. 18, 1934

1,984,950

UNITED STATES PATENT OFFICE 1,984,950

WASTE APPARATUS

Harry S. Steen, Chicago, Ill., assignor to Chicago Faucet Company, Chicago, Ill., a corporation of Illinois Application January 4, 1934, Serial No. 705,288

7 Claims. (Cl. 4—203)

This invention relates to improvements in waste apparatus and, more especially, to such apparatus adapted for operating the waste valve of a basin, bathtub, sink, or the like. For the purpose of illustrating my invention, I have shown it applied to a lavatory or basin waste.

Among the features of my invention is the provision of apparatus that is simple in construction and operation. My improved apparatus can also be easily and quickly installed and the same gives a substantially unobstructed waterway, there being almost complete absence of rods, levers, ball-joints, and the like, which heretofore have given trouble, not only in installation but also in maintenance. The action of my improved waste is direct and positive, requiring merely a push and pull action, and is entirely within the control of the user, yet practically beyond his power to abuse.

Other features and advantages of my invention will appear more fully as I proceed with my specification.

In that form of device embodying the features of my invention shown in the accompanying drawing—

Figure 1:
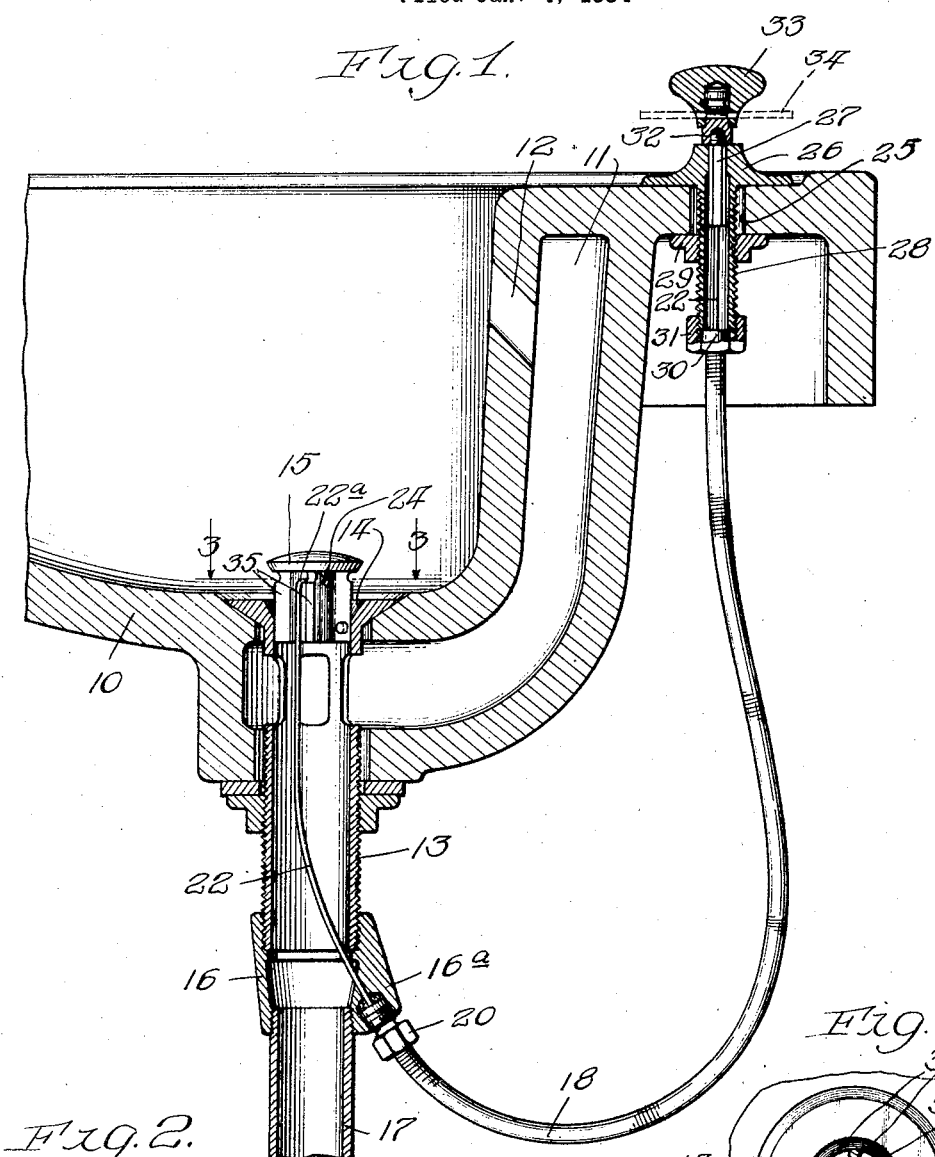
Figure 2:
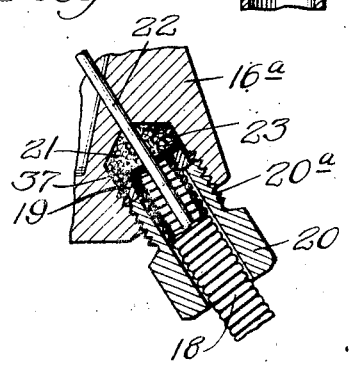
Figure 3:
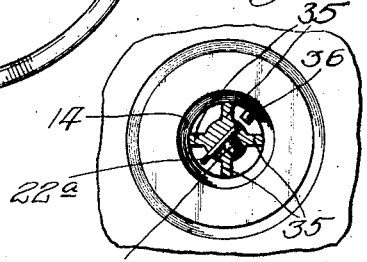

Figure 1 is a vertical sectional view; Fig. 2 is an enlarged view showing the attachment of the lower end of the flexible tube or casing; and Fig. 3 is a view taken as indicated by the line 3 of Fig. 1.

As shown in the drawing, 10 may indicate the wash bowl, lavatory, tub, or the like, and 11, the overflow port with the overflow opening 12. 13 indicates the waste pipe with the valve seat 14 and 15 indicates the vertically movable valve member or stopper.

To the lower end of the waste pipe 13 is attached a fitting 16 in the nature of a coupling which also carries the lower waste pipe 17. The fitting 16 is provided with an enlargement 16ª adapted to receive the lower end of a tubular or casing member 18, here shown as a flexible tube. Attachment is effected in the following manner. To the end of the flexible tube 18 is attached a collar 19. 20 indicates a nut rotatably mounted on the casing 18 behind this collar, and 37 a packing washer in front of this collar. One end of this nut is threaded, as indicated by 20ª, and is screwed into a threaded recess 23 in the part 16ª. In the bottom of the recess 23 is located packing 21. Located in the flexible tube 18 is a flexible operating member or wire 22. In the bottom of the recess 23 there is a hole just large enough to accommodate the wire 22 comfortably. The packing 21 surrounds the wire 22 and is compressed when the nut 20 is tightened, the washer 37 acting as a gland. In this manner, the flexible tube 18 is attached to the member 16 and the wire 22 is packed against escape of liquid.

It will be noted that the casing 18 is so attached to the body 16 as to direct the inner flexible operating member or wire 22 in a substantially vertical direction. The upper end of the wire 22 is attached to the stopper 15 by bending the end at right angles, as indicated by 22ª, inserting the same in a suitable hole in the stopper, and fastening by means of a set screw 24. See Fig. 3.

The other end of the casing or flexible tube 18 may be attached at any desired remote point in order to give remote control to the valve member 15. For example, as here shown, the upper end of the tube 18 is attached to the top of the basin. To this end there is provided a suitable hole 25 in which is mounted the guide collar 26 provided with a hexagonal opening accommodating the hexagonal rod 27 attached to the upper end of the wire 22. The member 26 is provided with a depending threaded shank 28 over which is fitted a nut 29 so that when the latter is screwed up against the bottom of the basin, the parts will be held in position. The upper end of the casing is attached to the lower end of the shank 28 in a similar manner as the lower end of the casing is attached to the member 16, except that no packing for the wire 22 is required. In other words, the upper end of the casing 18 is provided with a collar 30 held against the lower end of the shank 28 by the union nut 31.

The upper end of the hexagonal extension 27 on the wire 22 is threaded to receive the nut 32. The operating knob 33 is swiveled on this nut. There is a hole through the shank of the knob and one of the same size through the nut. In installing the knob, a nail 34 or similar member is inserted through these holes when they are in registry. This permits tightening of the nut 32 on the threaded end of the member 27, after which the nail 34 is removed, allowing the knob to swivel so that rotation of the knob 33 cannot injure the mechanism.

The valve member 15 has depending therefrom vertical guides or fins 35 adapted to slidably engage the inner wall of the waste pipe 13. The waste pipe 13 has a pin or stud 36 so positioned on its inner wall as to lie between two of the guides 35. This pin 36 in no way interferes with vertical motion of the valve member 15, but prevents substantial rotation of said valve member. This feature obviates the possibility of the wire 22 being broken or kinked by twisting of the valve member 15.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. Structure of the character described, including: a substantially vertical waste pipe; a vertically movable valve member in the waste pipe; and a flexible guide casing with a flexible operating member slidably mounted therein, one end of said guide casing attached to the waste pipe so as to direct the flexible operating member into the waste pipe in a substantially vertical direction, one end of said operating member being attached to said valve member, the other end of said casing being fixed at a point remote from said valve member, said operating member projecting from said casing at said point and being provided with means whereby the same may be manually operated.

2. Structure as claimed in claim 1, in which the operating member at the remote point is non-rotatably mounted in a guide member.

3. Structure as claimed in claim 1, in which the operating member at the remote point is non-rotatably mounted in a guide member and is provided with means for manually operating the same, said means being rotatably mounted on said operating member.

4. Structure as claimed in claim 1, in which the valve member is non-rotatably mounted in the waste pipe, and in which the operating member is provided with means for manually operating the same, said means being rotatably mounted on said operating member.

5. Structure of the character described, including: a substantially vertical waste pipe; a vertically movable valve member in the waste pipe; a guide casing having one end attached to the waste pipe and the other end fixed at a point remote from said valve member; and a flexible operating member extending through the casing with one end projecting into the waste pipe and connected to the valve member and the other end extending out of the casing and provided with means for operating the same.

6. Apparatus as claimed in claim 5, in which the operating member is packed against leakage of liquid where the same enters the waste pipe.

7. Apparatus as claimed in claim 5, in which the valve member is non-rotatably mounted in the waste pipe, and in which the means for operating the operating member is rotatably mounted thereon.

HARRY S. STEEN.